(12) United States Patent
Lebby et al.

(10) Patent No.: US 11,067,748 B2
(45) Date of Patent: Jul. 20, 2021

(54) GUIDE TRANSITION DEVICE AND METHOD

(71) Applicant: Lightwave Logic Inc., Longmont, CO (US)

(72) Inventors: Michael Lebby, San Francisco, CA (US); Frederick J Leonberger, Sarasota, FL (US); Richard Becker, Cupertino, CA (US)

(73) Assignee: Lightwave Logic Inc., Englewood, CO (US)

( * ) Notice: Subject to any disclaimer, the term of this patent is extended or adjusted under 35 U.S.C. 154(b) by 80 days.

(21) Appl. No.: 16/678,282

(22) Filed: Nov. 8, 2019

(65) Prior Publication Data

US 2020/0088939 A1 Mar. 19, 2020

Related U.S. Application Data

(62) Division of application No. 15/704,739, filed on Sep. 14, 2017, now Pat. No. 10,509,164.

(51) Int. Cl.
*G02B 6/12* (2006.01)
*G02B 6/138* (2006.01)
(Continued)

(52) U.S. Cl.
CPC ..... *G02B 6/12002* (2013.01); *G02B 6/12004* (2013.01); *G02B 6/1221* (2013.01); *G02B 6/1228* (2013.01); *G02B 6/132* (2013.01); *G02B 6/136* (2013.01); *G02B 6/138* (2013.01); *G02F 1/065* (2013.01); *G02F 1/225* (2013.01); *G02B 6/4214* (2013.01);
*G02B 2006/12085* (2013.01); *G02B 2006/12104* (2013.01); *G02B 2006/12107* (2013.01); *G02B 2006/12121* (2013.01);
(Continued)

(58) Field of Classification Search
CPC .... G02B 6/132; G02B 6/136; G02B 6/12002; G02B 6/138; G02B 6/12004; G02B 6/1221; G02B 6/1228; G02B 6/4214; G02B 2006/12107; G02B 2006/12121; G02B 2006/12142; G02B 2006/12161; G02B 2006/12085; G02B 2006/12104; G02F 1/225; G02F 1/065
See application file for complete search history.

(56) References Cited

U.S. PATENT DOCUMENTS 6,067,387 A * 5/2000 Oh .......................... G02F 1/065
385/2
6,934,313 B1 * 8/2005 Deacon ................. H01S 5/4062
372/64

(Continued)

*Primary Examiner* — Ryan A Lepisto
*Assistant Examiner* — Erin D Chiem
(74) *Attorney, Agent, or Firm* — Parsons & Goltry; Robert Parsons; Michael Goltry

(57) ABSTRACT

A guide transition device including a light source designed to generate a light beam, a light input port on a first plane and coupled to receive the light beam from the light source, a light output port on a second plane different than the first plane, the light output port designed to couple a received light beam to output equipment and plane shifting apparatus coupled to receive the light beam from the light input port on the first plane and to shift or transfer the light beam to the second plane. The plane shifting apparatus is coupled to transfer the light beam to the light output port on the second plane.

5 Claims, 16 Drawing Sheets

(51) Int. Cl.
  *G02B 6/122*  (2006.01)
  *G02F 1/225*  (2006.01)
  *G02B 6/136*  (2006.01)
  *G02F 1/065*  (2006.01)
  *G02B 6/132*  (2006.01)
  *G02B 6/42*  (2006.01)

(52) U.S. Cl.
  CPC ............. *G02B 2006/12142* (2013.01); *G02B 2006/12161* (2013.01); *G02F 2202/022* (2013.01)

(56) References Cited

U.S. PATENT DOCUMENTS

| | | | |
|---|---|---|---|
| 7,483,140 B1* | 1/2009 | Cho | G01N 21/553 356/445 |
| 7,599,594 B1* | 10/2009 | Fitz | G02B 6/132 385/129 |
| 7,656,922 B2* | 2/2010 | Behfar | H01S 5/0265 372/50.1 |
| 8,249,404 B2* | 8/2012 | Fujii | G02B 6/4214 385/31 |
| 9,613,886 B2* | 4/2017 | Lin | H01L 23/60 |
| 2004/0037487 A1* | 2/2004 | Nakaya | G03F 7/70291 385/14 |
| 2011/0052114 A1* | 3/2011 | Bernasconi | H01S 5/50 385/3 |
| 2011/0142395 A1* | 6/2011 | Fortusini | G02B 6/124 385/37 |
| 2013/0163928 A1* | 6/2013 | Wang | G02B 6/1221 385/37 |
| 2015/0063745 A1* | 3/2015 | Lin | H01S 5/026 385/14 |
| 2016/0248225 A1* | 8/2016 | Sayyah | H01S 5/06821 |
| 2016/0294155 A1* | 10/2016 | Zheng | G02B 6/12004 |

* cited by examiner

40'

40'

100'

100'

GUIDE TRANSITION DEVICE AND METHOD

CROSS REFERENCE TO RELATED APPLICATIONS

This application is a divisional application of currently pending U.S. application Ser. No. 15/704,739, filed 14 Sep. 2017.

FIELD OF THE INVENTION

This invention relates to guiding light from semiconductor lasers in layers of polymers on a semiconductor substrate and more particularly to transitioning light from one layer to another to reduce optical cross-talk and other interference.

BACKGROUND OF THE INVENTION

Polymer modulators driven by semiconductor lasers are a popular apparatus for modulating a light beam. In a copending application entitled "Polymer Modulator and Laser Integrated on a Common Platform and Method", filed Aug. 31, 2017, with application Ser. No. 15/692,080, and incorporated herein by reference, the modulator and laser are integrated on a common platform, such as an InP chip or substrate.

One problem with including various light devices, such as light generating devices and light using devices, on a common plane or level is that light can couple between devices along unintended paths, such as through reflections or tunneling, to cause optical cross-talk and other interference. Further, light coupling between devices and between inputs and outputs can be inefficient with lost light traveling through the optical system to cause optical cross-talk and other interference.

It would be highly advantageous, therefore, to remedy the foregoing and other deficiencies inherent in the prior art.

Accordingly, it is an object of the present invention to provide a new and improved guide transition device for efficiently coupling light between devices and to output apparatus.

It is another object of the present invention to provide a new and improved guide transition device for coupling light from one planes to another plane to reduce optical cross-talk and other interference.

SUMMARY OF THE INVENTION

Briefly to achieve the desired objects and advantages of the instant invention in accordance with a preferred embodiment a guide transition device is provided that includes a light source designed to generate a light beam, a light input port on a first plane and coupled to receive the light beam from the light source, and a light output port on a second plane different than the first plane. The light output port is designed to couple a received light beam to output equipment. The guide transition device further includes plane shifting apparatus coupled to receive the light beam from the light input port on the first plane and to shift or transfer the light beam to the second plane. The plane shifting apparatus is further coupled to transfer the light beam to the light output port on the second plane.

To further achieve the desired objects and advantages of the present invention a specific embodiment of a guide transition device comprises a platform including a semiconductor waveguide defining a light input port for receiving a light beam. The semiconductor laser is positioned on a first plane and one end of the semiconductor waveguide is formed into an angled surface. A polymer planarizing layer deposited on the platform in abutting engagement with the angled surface provides a first angular deflection surface. A lower polymer cladding layer deposited on the polymer planarizing layer, a polymer core deposited on the lower polymer cladding layer, and an upper polymer cladding layer deposited on the core and lower polymer cladding layer form a polymer waveguide on a second plane different than the first plane with a first end defining a light output port. Portions of the lower polymer cladding layer, the core, and the upper polymer cladding layer are removed to form a second angular deflection surface at an end of the polymer waveguide opposite the first end. The first angular deflection surface and the second angular deflection surface have compatible angles so that a light beam directed into the light input port defined by the semiconductor waveguide on the first plane is deflected into the core of the polymer waveguide on the second plane.

To further achieve the desired objects and advantages of the present invention a specific method of fabricating a guide transition device includes the step of providing a platform including a semiconductor waveguide defining a light input port for receiving a light beam with the semiconductor laser positioned on a first plane. The method includes the steps of forming one end of the semiconductor waveguide into an angled surface and depositing a polymer planarizing layer on the platform in abutting engagement with the angled surface to provide a first angular deflection surface. The method further includes the steps of depositing a lower polymer cladding layer on the polymer planarizing layer, depositing a polymer core on the lower polymer cladding layer, and depositing an upper polymer cladding layer on the core and lower polymer cladding layer. The lower polymer cladding layer, the polymer core, and the upper polymer cladding layer form a polymer waveguide on a second plane different than the first plane with a first end defining a light output port. The method further includes the steps of removing portions of the lower polymer cladding layer, the core, and the upper polymer cladding layer to form a second angular deflection surface at an end of the polymer waveguide opposite the first end. The first angular deflection surface and the second angular deflection surface have compatible angles so that a light beam directed into the light input port defined by the semiconductor waveguide on the first plane is deflected into the core of the polymer waveguide on the second plane.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

A primary object of the present invention is to provide a new and improved guide transition device fabricated in light guiding apparatus including a substrate and multiple polymer layers. The guide transition device is designed to efficiently couple light from one layer or plane of the light guiding apparatus to another layer or plane of the light guiding apparatus to reduce optical cross-talk and other interference. In the preferred embodiment, the light guiding apparatus includes a light input port coupled to receive light from a light source, such as a semiconductor laser or waveguides fabricated to guide light from a laser, positioned on a first plane, plane shifting apparatus coupled to receive the light from the light input port and to shift or transfer the light to another or second layer or plane, above or below the first layer or plane, and a light output port on the second layer or plane coupled to the plane shifting apparatus and designed to couple light from the plane shifting apparatus to some type of output equipment, such as an optical fiber, waveguide, etc. The plane shifting apparatus can be, for example, an angular deflection surface, explained in more detail below, or gratings.

Figure 1:
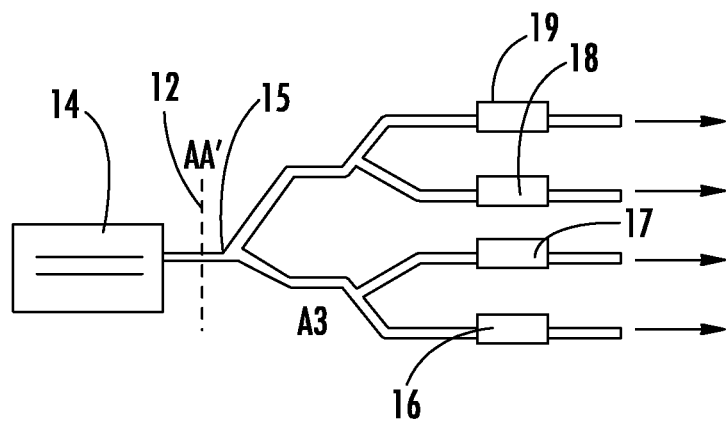
FIG. 1 is a top view of a PSM (phase shift modulation) layout with a single laser source divided into four inputs for four different modulators using a guide transition device (GTD) to couple the four inputs into four waveguides and then out to four fiber cables, according to the present invention.

Turning to FIG. 1, an example of phase shift modulation (PSM) apparatus 10 incorporating a guide transition device 12, in accordance with the present invention, is illustrated. In this example, guide transition device 12 receives light from a source 14, such as a semiconductor laser, on a first level and shifts or transfers the light to a second level. On the second level guide transition device 12 couples the light to a first waveguide 15 that is split into two waveguides using a splitter with each of the two waveguides being split for a total of four waveguides. Each of the four waveguides is then coupled to or passes through a modulator 16, 17, 18, and 19, respectively, and extends to the edge of the chip ready to launch the phase modulated light into fiber optics or the like. Modulators 16, 17, 18, and 19 can alternatively be intensity modulators, for example, a Mach-Zehnder modulator, a directional-coupler modulator, a polarization modulator, etc. In such embodiments, the modulator becomes an intensity modulator (IM); the use of the term "PSM" herein is generic and includes all of the above listed modulators.

Figure 2:
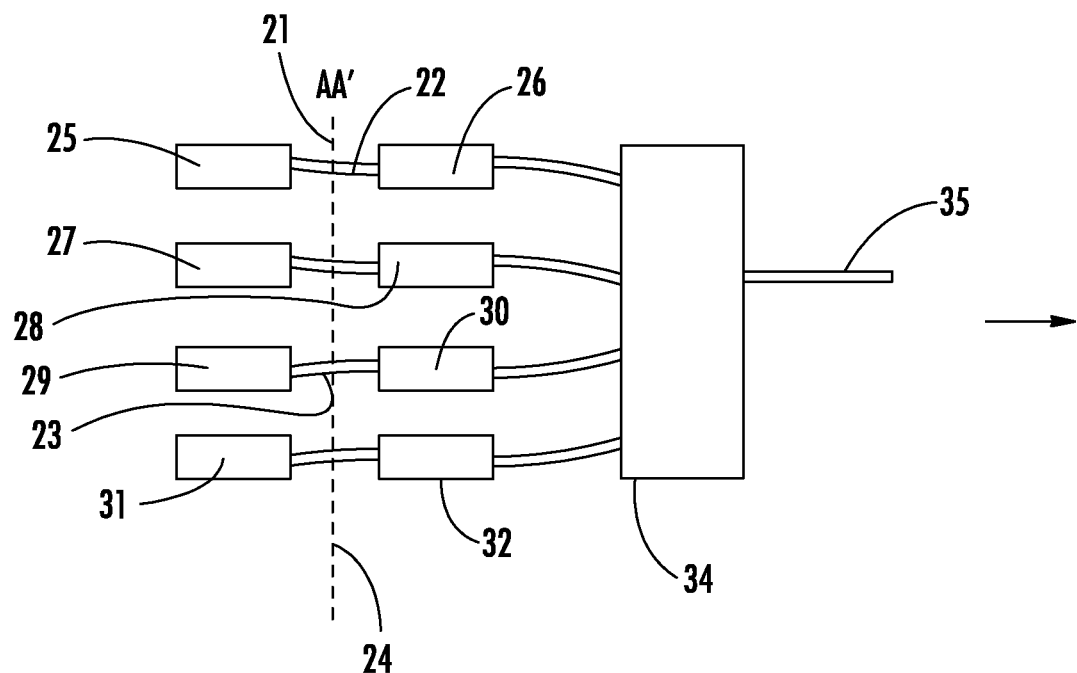
FIG. 2 is a top view of a WDM (wavelength division multiplexing) layout with four different wavelength lasers coupled by four GTDs and then mux'd into one waveguide and out to a fiber cable, according to the present invention.

Turning to FIG. 2, an example of wavelength division multiplexing (WDM) apparatus 20 incorporating four guide transition devices 21, 22, 23, and 24, in accordance with the present invention, is illustrated. Guide transition device 21 couples light from a light source 25, such as a semiconductor laser, on a first level, to a polymer waveguide and modulator 26 on a second, different level. Similarly, guide transition device 22 couples light from a light source 27 to a polymer waveguide and modulator 28 on a second, different level, guide transition device 23 couples light from a light source 29 to a polymer waveguide and modulator 30 on a second, different level, and guide transition device 24 couples light from a light source 31 to a polymer waveguide and modulator 32 on a second, different level. Light from polymer waveguides and modulators 26, 28, 30, and 32 is coupled to a multiplexer 34 where the four inputs are multiplexed down to a single output fiber 35. Examples of devices that can be used for multiplexer 34 include a multimode modulator interferometer (MMI), thin film filters, Eschelle gratings, arrayed waveguide gratings (AWG), or the like. Modulators 26, 28, 30, and 32 can be phase, polarization, or intensity modulators (see above).

Thus, in PSM apparatus 10 a single light source is coupled through a single guide transition device into four fibers and four modulators to produce four different phase (or intensity) signals. In WDM apparatus 20, four lasers operating at four different wavelengths, couple via four guide transition devices into four modulators/waveguides that are muxed into a single output fiber. In all instances the guide transition devices shift or transfer the light from the level or plane in which the light source lies, to another plane or level containing waveguides and modulators to essentially separate or insulate the waveguides and modulators from any stray light produced by the light source.

Figure 3A:
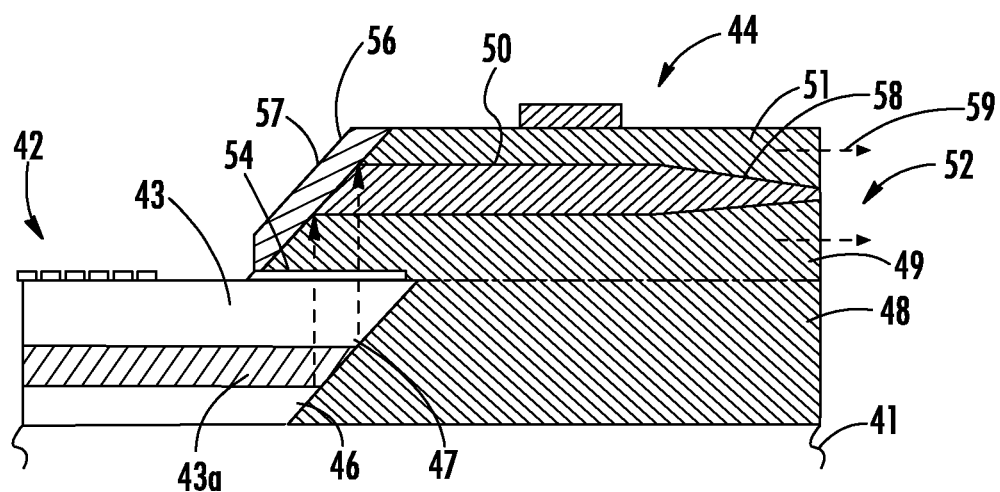
FIG. 3A is a cross-sectional view of an example of a narrow spot design for a guide transition device in accordance with the present invention.
Figure 3B:
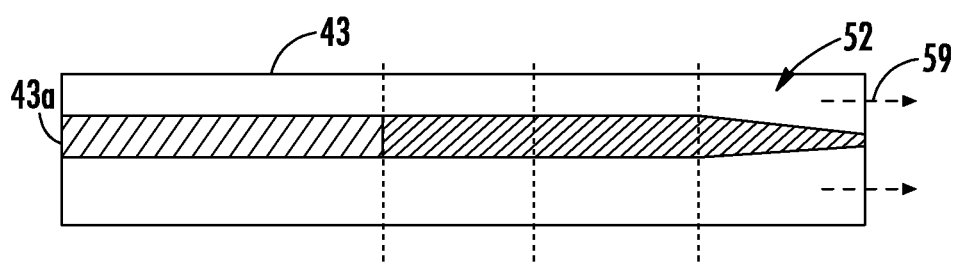
FIG. 3B is a top view of the guide transition device illustrated in FIG. 3A.

Referring now to FIGS. 3A and 3B, a guide transition device 40 is provided as an example of a guide transition device that could be used in either of PSM apparatus 10 or WDM apparatus 20 or any other light guiding apparatus. In this specific example, a monolithic semiconductor laser 42 and a polymer waveguide modulator 44 are included in device 40 and fabricated on a substrate 41, which in this preferred embodiment is monolithic InP but can be other semiconductors or metals, such as silicon, silicon carbide, GaN, GaAs, InSb, metals, sapphire, etc. Monolithic laser 42 can be a distributed feedback (DFB) laser, a Fabry-Perot (FB) laser, a distributed Bragg reflector (DBR) laser, a tunable laser, VCSEL (Vertical Cavity Surface Emitting Laser) or any other type of semiconductor laser. Laser 42 includes an output semiconductor waveguide 43 (with a core 43a) which is angularly etched at 46 and most of the epi material is removed from substrate 41 beyond angular etch 46 to minimize the problems of trying to deposit polymers in a trench-like structure. A lower polymer layer 48 is deposited on substrate 41 to planarize substrate 41 and to form an angular deflection surface 47 with the angular etch 46. Alternatively, an insulating oxide or nitride could be deposited on substrate 41 to planarize substrate 41 and to form an angular deflection surface 47 with the angular etch 46. These techniques are also compatible with use of a lower electrode to enable vertical poling in the polymer waveguide.

A relatively thick lower cladding layer 49 is deposited on the upper surfaces of laser 42 and lower polymer layer 48, a core polymer is deposited on the upper surface of lower cladding layer 49 and etched to form a waveguide core 50, and an upper polymer cladding layer 51 is deposited around waveguide core 50 to form a polymer waveguide 52. In some instances, it may be desirable to deposit an anti-reflective (AR) coating 54 on the upper surface of laser 42 prior to depositing lower cladding layer 49 to reduce or remove any reflections at the abutting surfaces. Usually the AR coating can be completed via dielectric deposition using CVD, PECVD, sputtering, ebeam, etc. Materials for the dielectric coating can be, for example, oxides, nitrides, and combinations thereof deposited with a thickness for anti-reflection properties. Also, a relatively thick lower cladding layer 49 is deposited to minimize light leakage from polymer core 50 to substrate 41.

Lower cladding layer 49, core 50, and upper polymer cladding layer 51 (i.e. polymer waveguide 52) are etched at an angle and through to the upper surface of laser 42 to form an angular deflection surface 56. In this example, angular deflection surface 47 and angular deflection surface 56 are included in the plane shifting apparatus that shifts light from the laser source on one plane to waveguide 52 and the light output on a different plane. The angle of surface 56 is selected to be compatible with the etched angle of angular deflection surface 47, resulting in high optical coupling into waveguide 52. In this preferred embodiment, deflection surface 47 deflects the received light beam at an angle of approximately 90 degrees (plus or minus 10 degrees) and deflection surface 56 is compatible to deflect the received light beam into waveguide core 50 parallel to the second plane. The semiconductor guide width (i.e. the output of laser 42 adjacent angular deflection surface 47) can also be adjusted relative to the width of polymer waveguide 52 to enhance coupling using mode-size conversion designs. To further enhance reflection at angular deflection surface 56, a high reflective coating 57 can be deposited on the outer surface of angular deflection surface 56. In this specific example, polymer waveguide modulator 44 is formed in waveguide 52 between angular deflection surface 56 and taper 58 of core 50. Modulator 44 can be for example, a Mach-Zehnder modulator, an intensity or phase modulator, etc.

A typical semiconductor laser will put-out a spot (beam area) with 35 degrees vertical divergence and 15 degrees horizontal divergence which means the laser beam diverges hugely. As explained, in the guide transition device 40 the laser beam is coupled into waveguide 52 which keeps the beam from diverging any more. Unfortunately, the dimensions of waveguide 52 are relatively tiny. Waveguide 52 will couple the spot (reflected laser beam) into the small dimensions of waveguide 52 and for guide transition device 40 to operate better between the planes or levels, there must be as much alignment tolerance (e.g. at the output of waveguide 52) as possible. Better alignment tolerance is achieved in guide transition device 40 by reducing core 50 of waveguide 52 to a taper 58 adjacent the output, which produces a large spot size, represented by broken lines 59, at the output edge of waveguide 52 for coupling into external equipment, such as fibers or the like. The large spot size 59 at the output makes the alignment of guide transition device 40 with exterior equipment easier and more manufacturable.

Figure 4A:
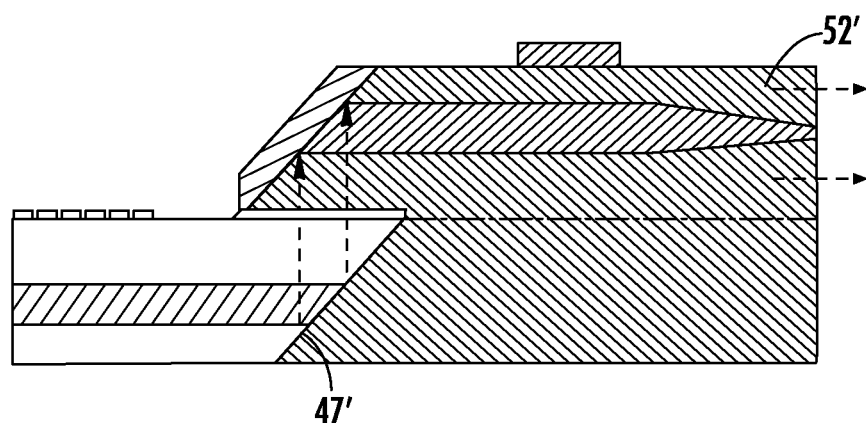
FIG. 4A is a cross-sectional view of another example of a narrow spot design for a guide transition device in accordance with the present invention.
Figure 4B:
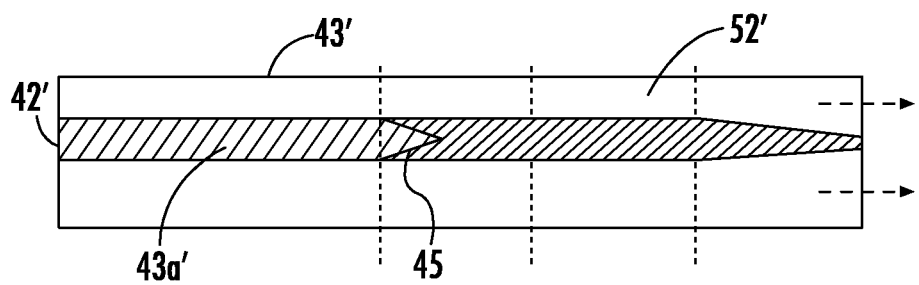
FIG. 4B is a top view of the guide transition device illustrated in FIG. 4A.

Referring additionally to FIGS. 4A and 4B, a guide transition device 40' is provided as another example of a guide transition device that could be used in either of PSM apparatus 10 or WDM apparatus 20 or any other light guiding apparatus. Components of guide transition device 40' that are the same as components of guide transition device 40 of FIGS. 3A and 3B are designated with a similar number and a prime (') is added to indicate the different embodiment. Guide transition device 40' is similar in all respects to guide transition device 40, except that core 43a' is tapered (designated 45 in FIG. 4B) as it approaches angular deflection surface 47' to increase the spot size of light deflected into core 50' of waveguide 52'. The large spot size 59 at the output of guide 43' makes the alignment of the planes easier and more manufacturable.

Figure 5A:
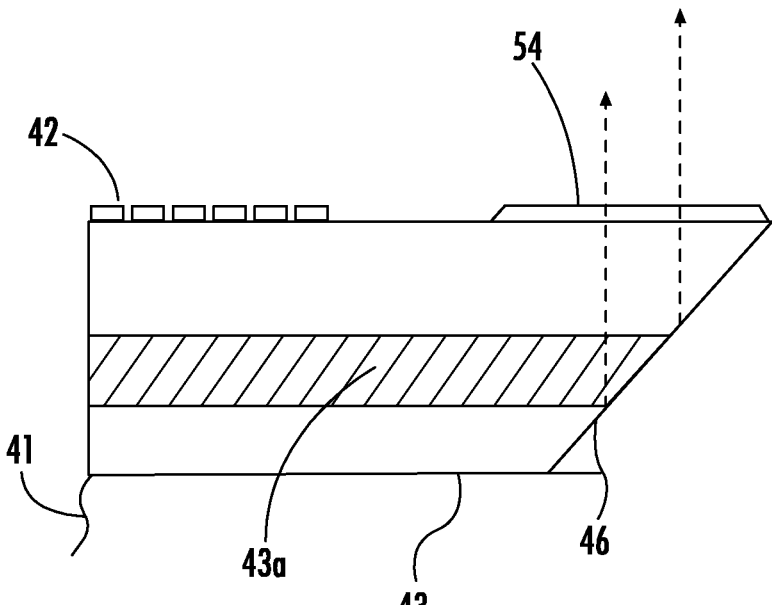
FIGS. 5A through 5I illustrate steps in the fabrication of the narrow spot design guide transition device of FIG. 3A in accordance with the present invention.

Referring now to FIGS. 5A through 5I, some sequential steps in a preferred process for fabricating guide transition devices, such as guide transition device 40, is illustrated. For convenience of understanding, the same numbers used in FIGS. 3A and 3B will be used in FIGS. 5A through 5I to designate the same components. Referring specifically to FIG. 5A, monolithic semiconductor laser 42 is fabricated on substrate 41, which in this preferred embodiment is InP but may be any semiconductor material. Monolithic laser 42 can be a distributed feedback (DFB) laser, a Fabry-Perot (FB) laser, a distributed Bragg reflector (DBR) laser, a tunable laser, VCSEL (Vertical Cavity Surface Emitting Laser) or any other type of semiconductor laser. Laser 42 includes an output waveguide 43 (with a core 43a) which is angularly etched at 46 and most of the epi material is removed from substrate 41 beyond angular etch 46 to minimize the problems of trying to deposit polymers in a trench-like structure. In some instances, it may be desirable to deposit an anti-reflective coating 54 on the upper surface of output waveguide 43 to reduce or remove any reflections at the surface. Coating 54 can be deposited as described above.

Figure 5B:
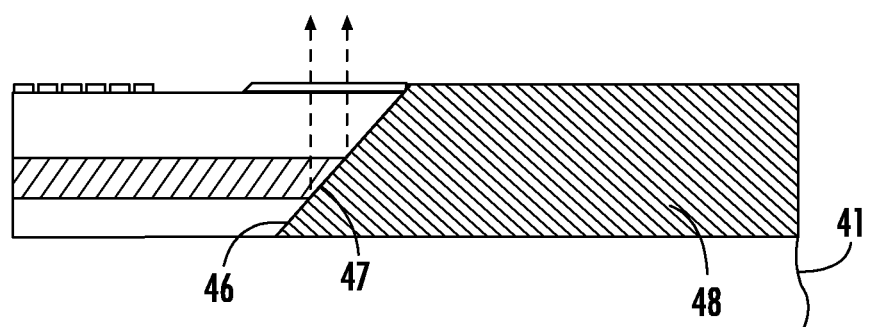

Referring additionally to FIG. 5B, lower polymer layer 48 is deposited on substrate 41 to planarize substrate 41 and to form an angular deflection surface 47 with the angular etch 46. In this preferred embodiment, lower polymer layer 48 is a spin-on coat or it could be deposited by CVD. After deposition, lower polymer layer 48 is etched back using an oxygen based process to planarize lower polymer layer 48.

Figure 5C:
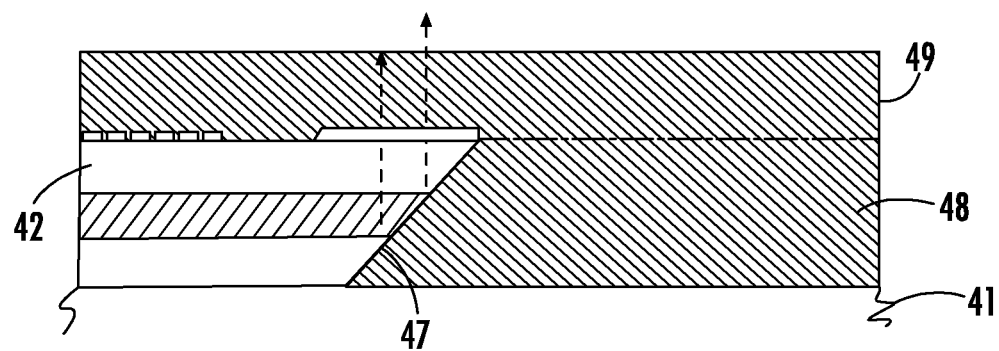
Figure 5D:
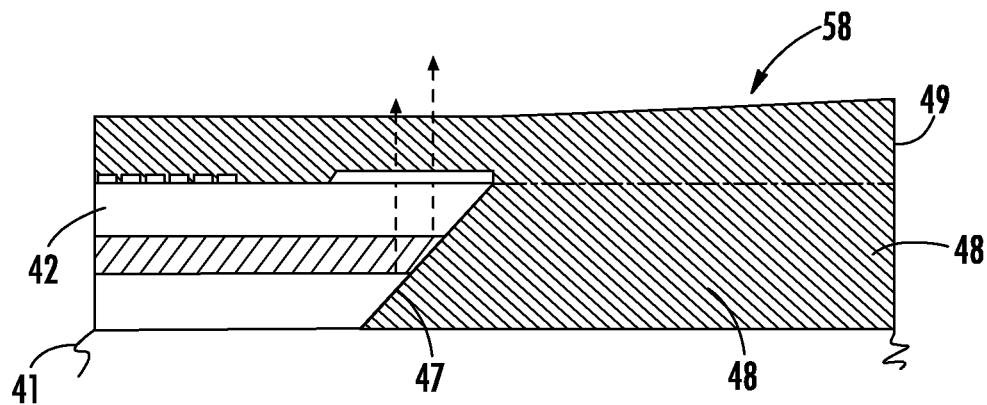

Referring additionally to FIG. 5C, a relatively thick lower cladding layer 49 is deposited on the upper surfaces of laser 42 and lower polymer layer 48. In this preferred embodiment, lower cladding layer 49 is a spin-on coat or it could be deposited by CVD. After deposition, lower cladding layer 49 is etched back using an oxygen based process to planarize lower cladding layer 49 and achieve a desired thickness. To reduce core 50 of waveguide 52 to taper 58 adjacent the output, photolithography masking and etching are used to define 2-dimensional taper 58 in the upper surface of lower cladding layer 49, as illustrated in FIG. 5D.

Figure 5E:
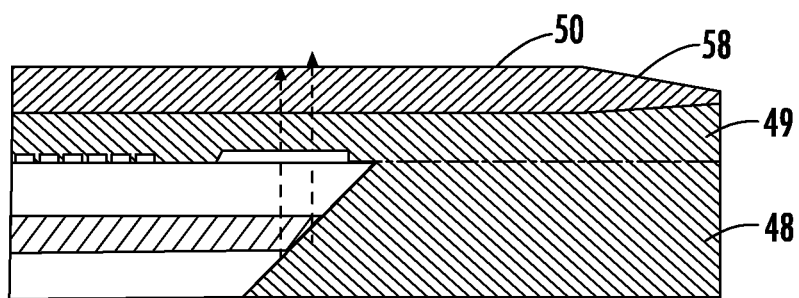
Figure 5F:
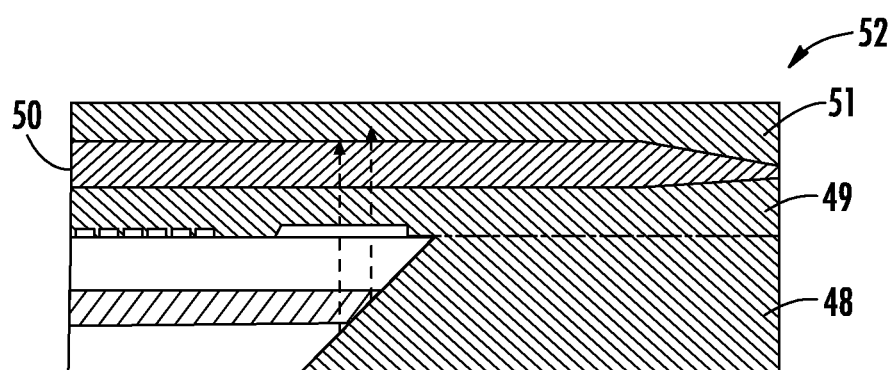

Referring additionally to FIG. 5E, a layer of polymer material is deposited on the upper surface of lower cladding layer 49 and shaped into waveguide core 50, including 2-dimensional taper 58, using photolithography masking and etching. Referring additionally to FIG. 5F, upper cladding layer 51 is deposited on lower cladding layer 49 and surrounding core 50. In this preferred embodiment, upper cladding layer 51 is deposited using spin-on deposition techniques and the conformity with core 50 planarizes waveguide 52.

Figure 5G:
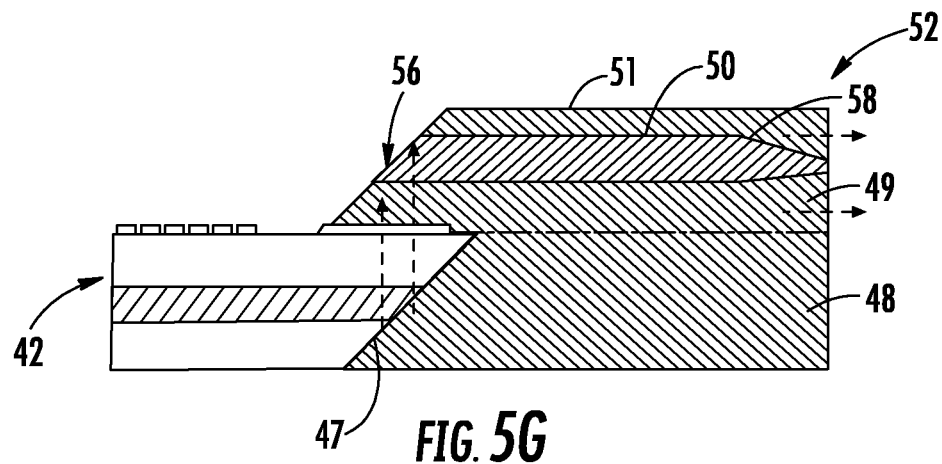
Figure 5H:
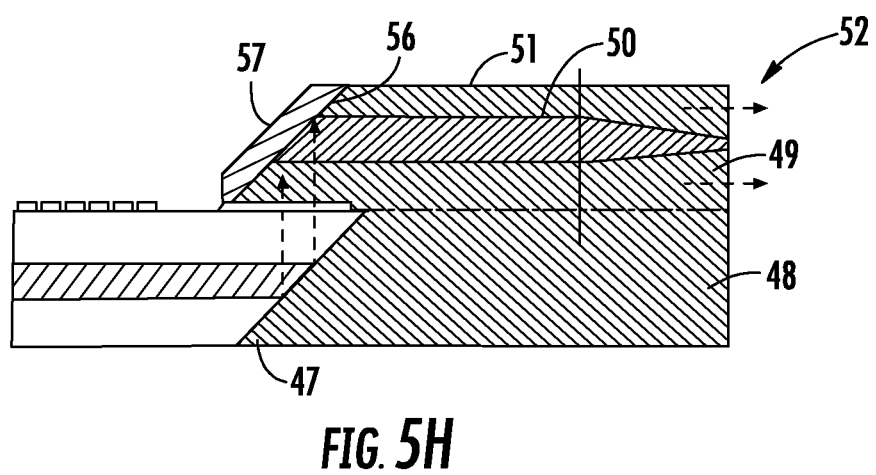
Figure 5I:
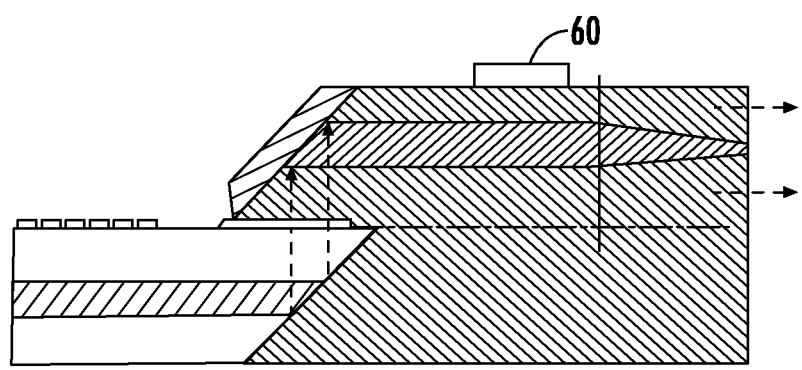

Turning to FIG. 5G, lower cladding layer 49, core 50, and upper polymer cladding layer 51 (i.e. polymer waveguide 52) are etched at an angle and through to the upper surface of laser 42 to form an angular deflection surface 56. The angle of surface 56 is selected to be compatible with the etched angle of angular deflection surface 47, resulting in high optical coupling into waveguide 52. Preferably, an HR (high reflectivity) reflector 57 is deposited on the outer surface of angular deflection surface 56, as illustrated in FIG. 5H. HR reflector 57 can be, for example, an HR coating, dielectric material, metallic, or combinations thereof. Metallic electrodes, designated 60 in FIG. 5I, are added for electrical connections to modulator 44.

Figure 6A:
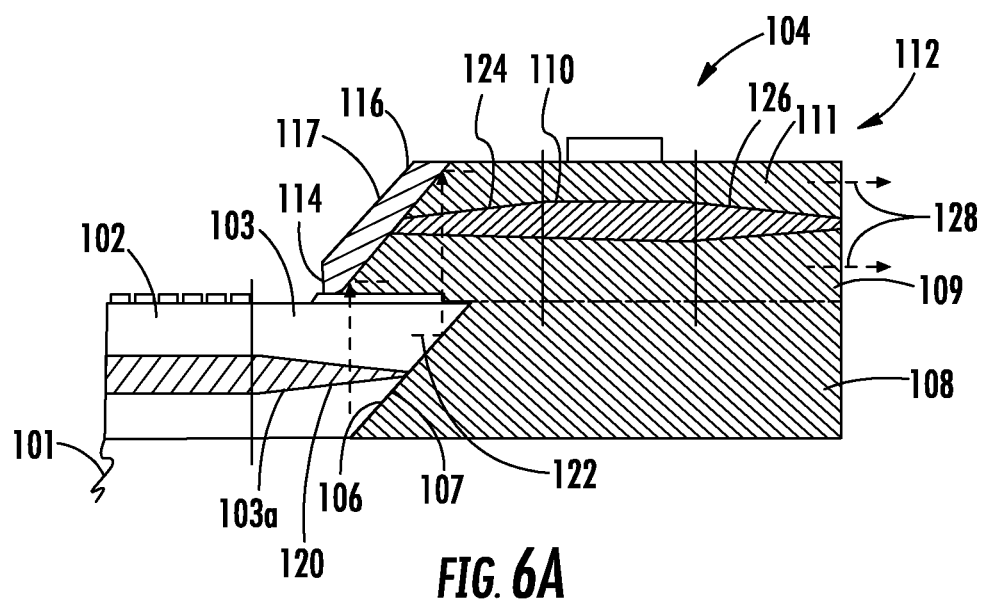
FIG. 6A is a cross-sectional view of an example of a large spot design for a guide transition device in accordance with the present invention.
Figure 6B:
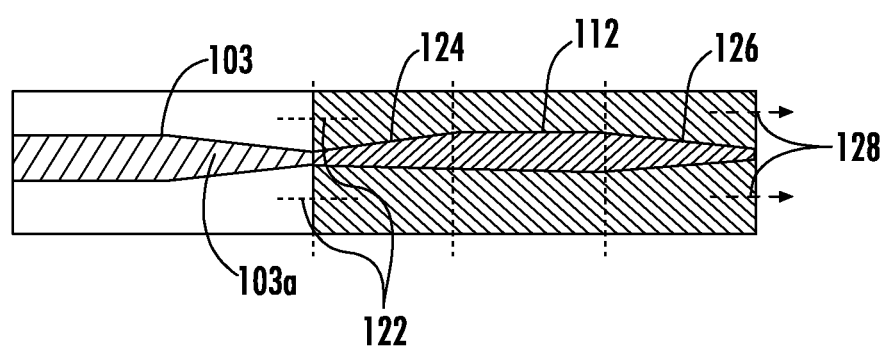
FIG. 6B is a top view of the guide transition device illustrated in FIG. 6A.

Referring now to FIGS. 6A and 6B, a guide transition device 100 is provided as an example of a guide transition device that could be used in either of PSM apparatus 10 or WDM apparatus 20 or any other light guiding apparatus. In this specific example, a monolithic semiconductor laser 102 and a polymer waveguide modulator 104 are included in device 100 and fabricated on a substrate 101, which in this preferred embodiment is monolithic InP but can be other semiconductors or metals, such as silicon, silicon carbide, GaN, GaAs, InP, metals, sapphire, etc. Monolithic laser 102 can be a distributed feedback (DFB) laser, a Fabry-Perot (FB) laser, a distributed Bragg reflector (DBR) laser, a tunable laser, VCSEL (Vertical Cavity Surface Emitting Laser) or any other type of semiconductor laser. Laser 102 includes an output semiconductor waveguide 103 (with a core 103a) which is angularly etched at 106 and most of the epi material is removed from substrate 101 beyond angular etch 106 to minimize the problems of trying to deposit polymers in a trench-like structure. A lower polymer layer 108 is deposited on substrate 101 to planarize substrate 101 and to form an angular deflection surface 107 with the angular etch 106. Alternatively, an insulating oxide or nitride could be deposited on substrate 101 to planarize substrate 101 and to form an angular deflection surface 107 with the angular etch 106. These techniques are also compatible with use of a lower electrode to enable vertical poling in the polymer waveguide. In some instances, it may be desirable to deposit an anti-reflective (AR) coating 105 on the upper surface of laser 102 prior to depositing a lower cladding layer 109 to reduce or remove any reflections at the abutting surfaces. Usually the AR coating can be completed via dielectric deposition using CVD, PECVD, sputtering, ebeam, etc. Materials for the dielectric coating can be, for example, oxides, nitrides, and combinations thereof deposited with a thickness for anti-reflection properties.

A relatively thick lower cladding layer 109 is deposited on the upper surfaces of laser 102 and lower polymer layer 108, a core polymer is deposited on the upper surface of lower cladding layer 109 and etched to form a waveguide core 110, and an upper polymer cladding layer 111 is deposited around waveguide core 110 to form a polymer waveguide 112. In some instances, it may be desirable to deposit an anti-reflective coating 114 on the upper surface of laser 102 prior to depositing lower cladding layer 109 to reduce or remove any reflections at the abutting surfaces. Also, a relatively thick lower cladding layer 109 is deposited to minimize light leakage from polymer core 110 to substrate 101.

Lower cladding layer 109, core 110, and upper polymer cladding layer 111 (i.e. polymer waveguide 112) are etched at an angle and through to the upper surface of laser 102 to form an angular deflection surface 116. In this example, angular deflection surface 107 and angular deflection surface 116 are included in the plane shifting apparatus that shifts light from the laser source on one plane to waveguide 112 and the light output on a different plane. The angle of surface 116 is selected to be compatible with the etched angle of angular deflection surface 107, resulting in high optical coupling into waveguide 112. To further enhance reflection at angular deflection surface 116, a high reflective coating 117 can be deposited on the outer surface of angular deflection surface 116.

For guide transition device 100 to operate most efficiently between the planes or levels and to make the alignment of guide transition device 100 easier and more manufacturable, there must be as much alignment tolerance as possible between the layers or planes. Better alignment tolerance is achieved in guide transition device 100 by reducing core 103a of laser output waveguide 103 to a taper 120 adjacent angular etch 106, which produces s large spot size, represented by broken lines 122, at angular deflection surface 107. The large spot size 122 deflected by angular deflection surface 107 onto angular deflection surface 116 at the input of waveguide 112 makes the alignment of guide transition device 100 easier and more manufacturable.

To further enhance alignment tolerance in guide transition device 100, waveguide core 110 includes a taper 124 in which the dimensions of core 110 are reduced as core 110 progresses from a midpoint to adjacent angular deflection surface 116. Taper 124, in conjunction with the large spot size deflected onto angular deflection surface 116, substantially increases alignment tolerance between the planes. Also, better alignment tolerance is achieved in guide transition device 100 by reducing core 110 of waveguide 112 to a taper 126 adjacent the output, which produces a large spot size, represented by broken lines 128, at the output edge of waveguide 112 for coupling into external equipment, such as fibers or the like. The large spot size 126 at the output makes the alignment of guide transition device 100 with exterior equipment easier and more manufacturable. In this specific example, polymer waveguide modulator 104 is formed in waveguide 112 between taper 124 and taper 126 of core 110. Modulator 104 can be for example, a Mach-Zehnder modulator, an intensity, polarization, or phase modulator, etc.

Figure 7A:
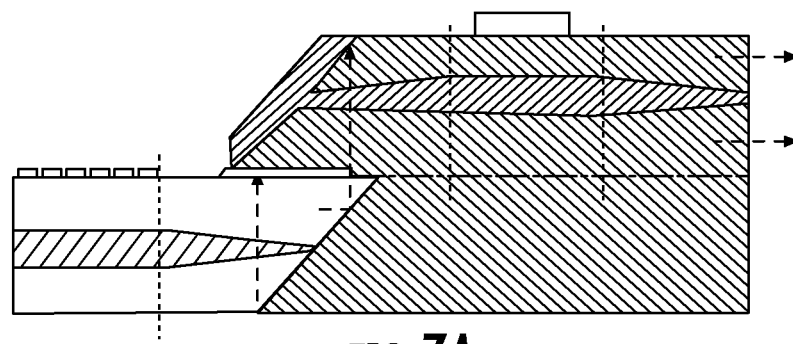
FIG. 7A is a cross-sectional view of another example of a large spot design for a guide transition device in accordance with the present invention.
Figure 7B:
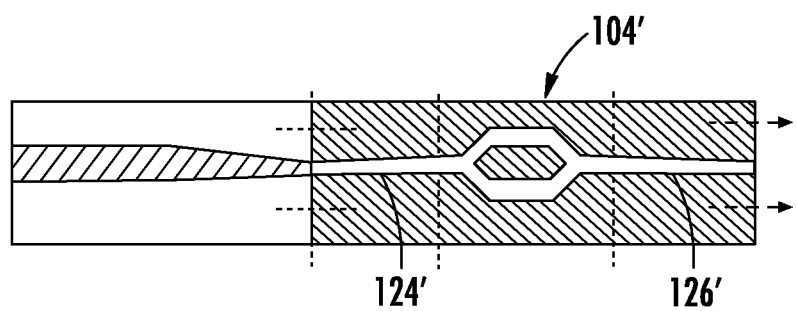
FIG. 7B is a top view of the guide transition device illustrated in FIG. 7A, showing a Mach-Zehnder modulator implemented between taper regions, according to the present invention.

Referring additionally to FIGS. 7A and 7B, a guide transition device 100' is provided as another example of a guide transition device that could be used in either of PSM apparatus 10 or WDM apparatus 20 or any other light guiding apparatus. Components of guide transition device 100' that are the same as components of guide transition device 100 of FIGS. 6A and 6B are designated with a similar number and a prime (') is added to indicate the different embodiment. Guide transition device 100' is similar in all respects to guide transition device 100, except that modulator 104 is a Mach-Zehnder modulator with core tapers 124' and 126' designed much smaller to accommodate Mach-Zehnder modulator 104' therebetween. The purpose of the examples illustrated in FIGS. 6A, 6B. 7A, and 7B are to illustrate specifically how various modulators can be incorporated into a guide transition device in accordance with the present invention.

Figure 8A:
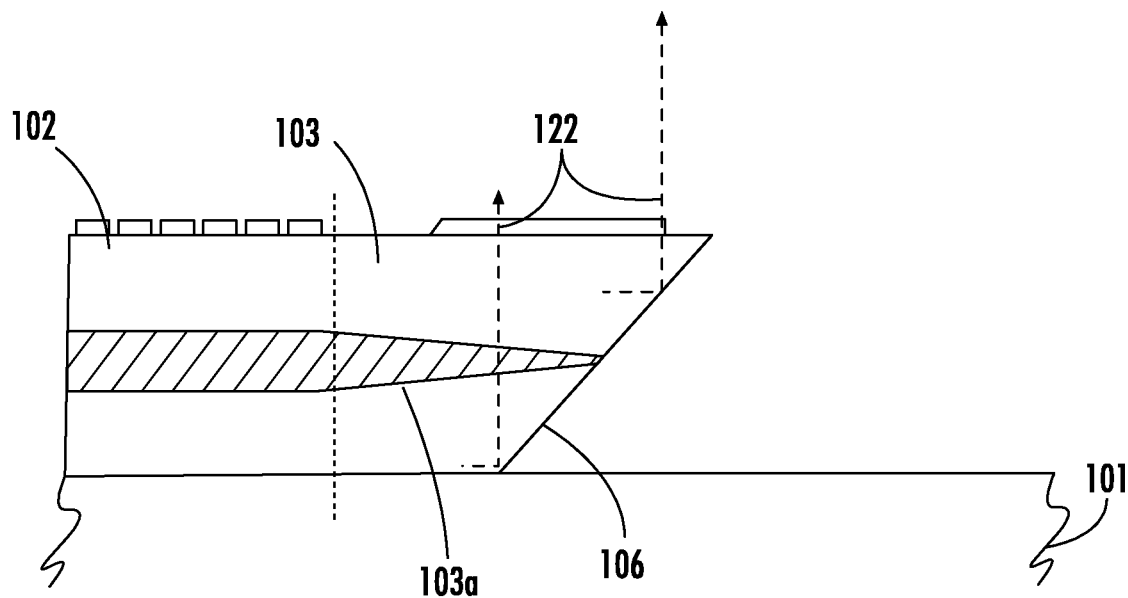
FIGS. 8A through 8I illustrate steps in the fabrication of the large spot design guide transition device of either FIG. 6A or FIG. 7A in accordance with the present invention.

Referring now to FIGS. 8A through 8I, some sequential steps in a preferred process for fabricating guide transition devices, such as guide transition device 100, is illustrated. For convenience of understanding, the same numbers used in FIGS. 6A and 6B will be used in FIGS. 8A through 8I to designate the same components. Referring specifically to FIG. 8A, monolithic semiconductor laser 102 is fabricated on substrate 101, which in this preferred embodiment is InP but may be any semiconductor material. Monolithic laser 102 can be a distributed feedback (DFB) laser, a Fabry-Perot (FB) laser, a distributed Bragg reflector (DBR) laser, a tunable laser, VCSEL (Vertical Cavity Surface Emitting Laser) or any other type of semiconductor laser. Laser 102 includes an output waveguide 103 (with a core 103a) which is angularly etched at 106 and most of the epi material is removed from substrate 101 beyond angular etch 106 to minimize the problems of trying to deposit polymers in a trench-like structure. In some instances, it may be desirable to deposit an anti-reflective coating 114 on the upper surface of laser output waveguide 103 to reduce or remove any reflections at the surface.

Figure 8B:
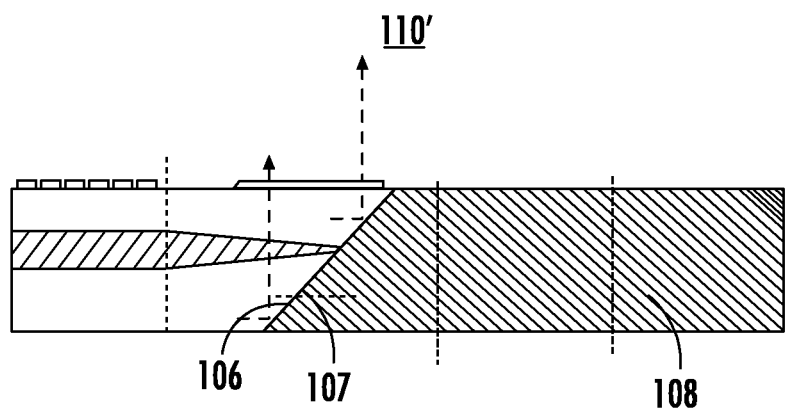

Referring additionally to FIG. 8B, lower polymer layer 108 is deposited on substrate 101 to planarize substrate 101 and to form an angular deflection surface 107 with the angular etch 106. In this preferred embodiment, lower polymer layer 108 is a spin-on coat or it could be deposited by CVD. After deposition, lower polymer layer 108 is etched back using an oxygen based process to planarize lower polymer layer 108. In some instances, it may be desirable to deposit an anti-reflective coating 105 on the upper surface of output waveguide 102 to reduce or remove any reflections at the surface. Coating 105 can be deposited as described above.

Figure 8C:
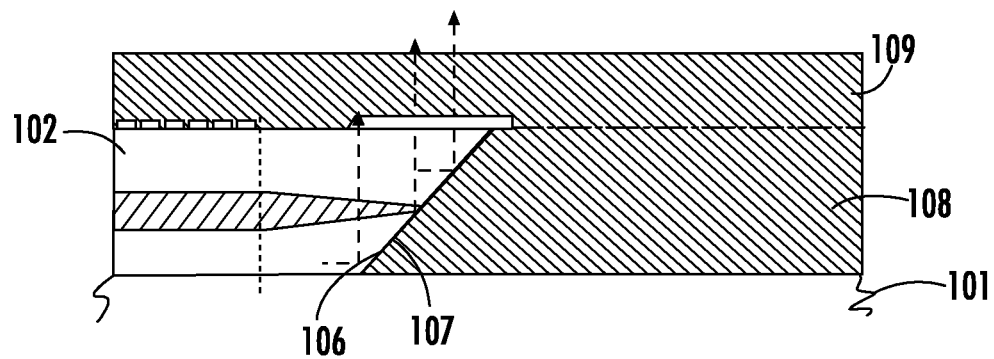
Figure 8D:
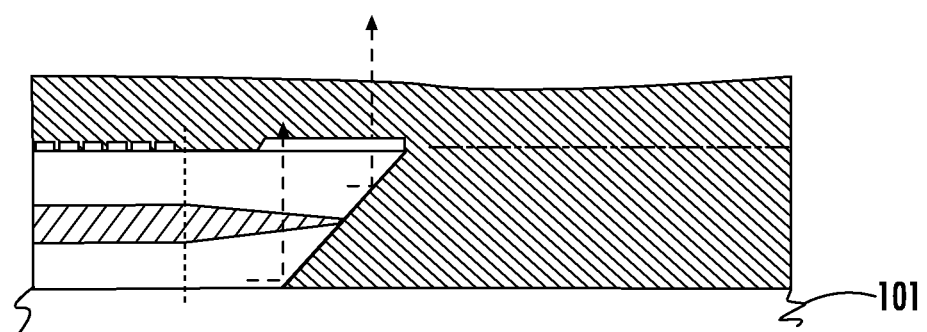

Referring additionally to FIG. 8C, a relatively thick lower cladding layer 109 is deposited on the upper surfaces of laser 102 and lower polymer layer 108. In this preferred embodiment, lower cladding layer 109 is a spin-on coat or it could be deposited by CVD. After deposition, lower cladding layer 109 is etched back using an oxygen based process to planarize lower cladding layer 109 and achieve a desired thickness. To reduce core 110 of waveguide 112 to tapers 124 and 126, photolithography masking and etching are used to define 2-dimensional tapers 124 and 126 in the upper surface of lower cladding layer 49, as illustrated in FIG. 8D.

Figure 8E:
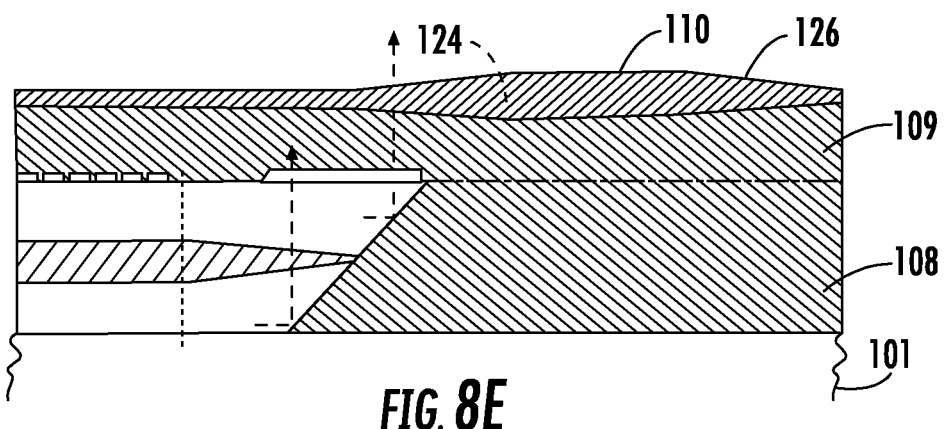
Figure 8F:
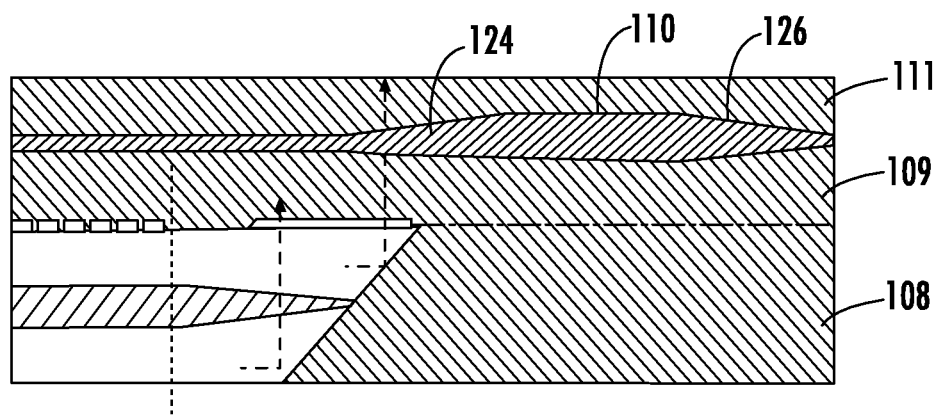

Referring additionally to FIG. 8E, a layer of polymer material is deposited on the upper surface of lower cladding layer 109 and shaped into waveguide core 110, including 2-dimensional tapers 124 and 126, using photolithography masking and etching. Referring additionally to FIG. 8F, upper cladding layer 111 is deposited on lower cladding layer 109 and surrounding core 110. In this preferred embodiment, upper cladding layer 111 is deposited using spin-on deposition techniques and the conformity with core 110 planarizes waveguide 112.

Figure 8G:
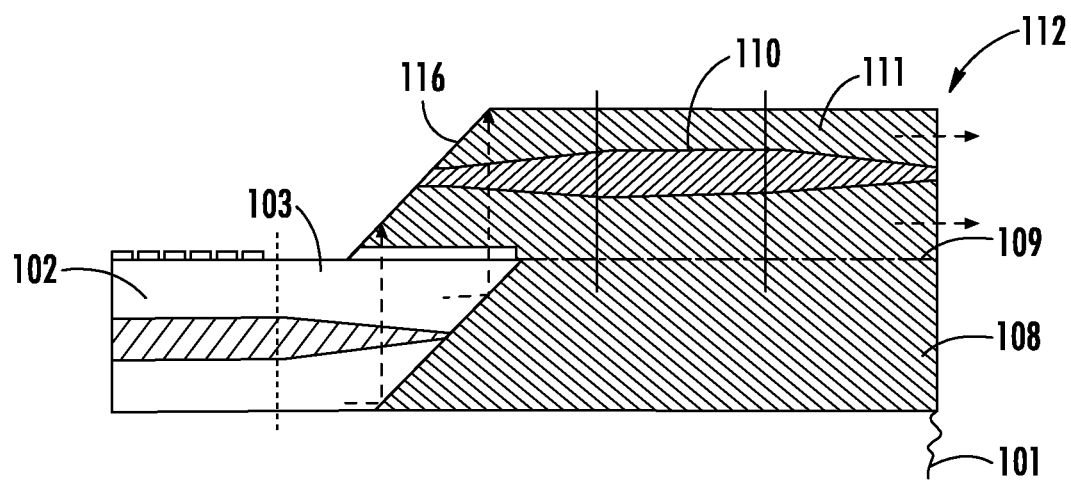
Figure 8H:
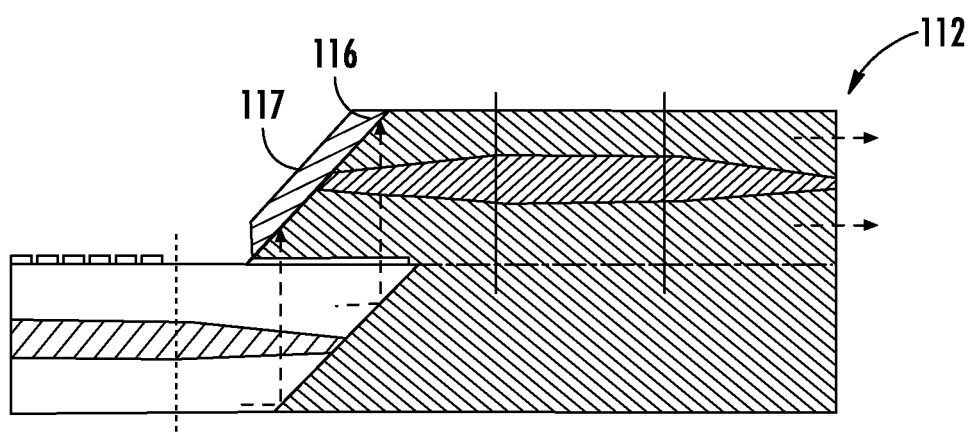
Figure 8I:
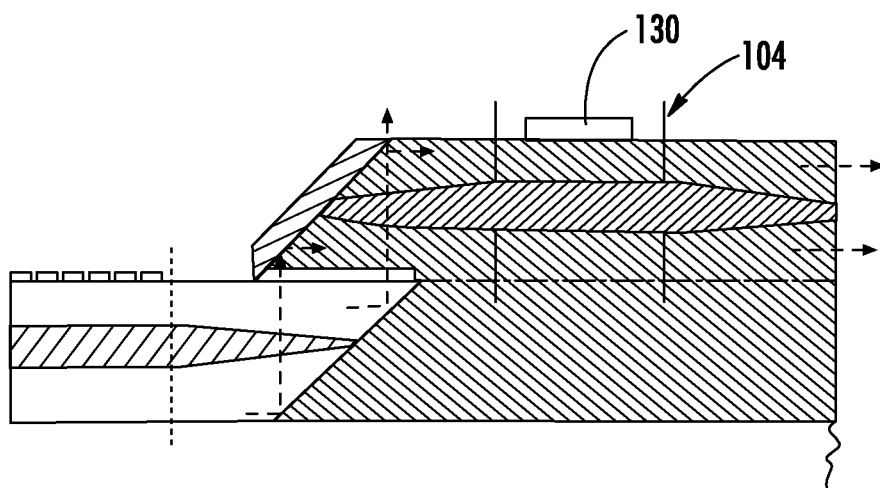

Turning to FIG. 8G, lower cladding layer 109, core 110, and upper polymer cladding layer 111 (i.e. polymer waveguide 112) are etched at an angle and through to the upper surface of laser 102 to form an angular deflection surface 116. The angle of surface 116 is selected to be compatible with the etched angle of angular deflection surface 107, resulting in high optical coupling into waveguide 112. Preferably, an HR (high reflectivity) reflector 117 is deposited on the outer surface of angular deflection surface 116, as illustrated in FIG. 8H. HR reflector 117 can be, for example, an HR coating, dielectric material, metallic, or combinations thereof. Metallic electrodes, designated 130 in FIG. 8I, are added for electrical connections to modulator 104.

Figure 9:
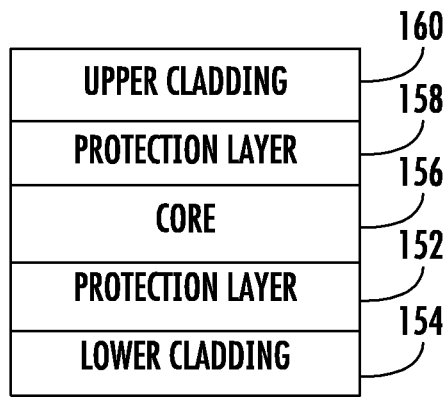
FIG. 9 is a cross-sectional view of a waveguide illustrating protection layers above and below the core.

Referring to FIG. 9, a cross-sectional view of a waveguide 150, such as waveguide 44 in FIG. 3A or waveguide 104 in FIG. 6A, is illustrated with a first protection layer 152 sandwiched between a lower polymer cladding layer 154 and a polymer core 156. A second protection layer 158 is sandwiched between polymer core 156 and an upper polymer cladding layer 160. Protection layers, such as protection layers 152 and 158 are useful during fabrication processes and need to be matched optically (refractive index) as well as chemically so that layers of polymers can be deposited without interference either by light or chemical reaction, because in the preferred embodiment the polymers are liquid that is spun-on and then polled and cured. It will be understood that while single protective layers 152 and 158 are illustrated for this example, additional layers might be included to increase protection and/or for other purposes.

Figure 10:
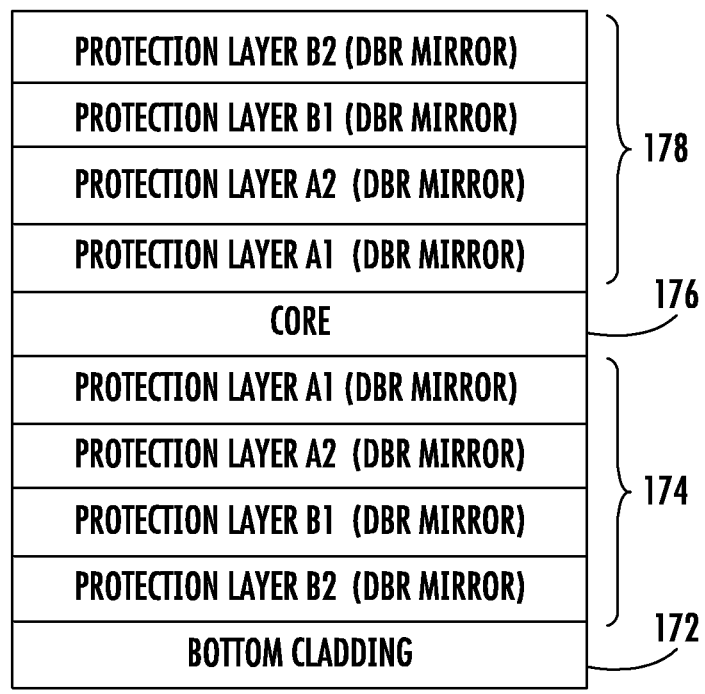
FIG. 10 is a cross-sectional view of a waveguide illustrating another arrangement of protection layers above and below the core.

Referring to FIG. 10, a cross-sectional view of another waveguide 170, is illustrated in which protective layers are formed to not only provide the functions described above but also aid in substantially reducing stray light loss. In this example, a series of four protective coatings, designated 174, are positioned between a bottom cladding layer 172 and a core 176. Series of layers 174 are specifically selected with different coefficients of reflection so as to operate as distributed Bragg reflectors (DBR) or mirrors that reflect stray light back into core 176. Similarly, a second series of protective layers, designated 178 are positioned on the upper surface of core 176. Series of layers 178 are specifically selected with different coefficients of reflection so as to operate as distributed Bragg reflectors (DBR) or mirrors that reflect stray light back into core 176.

Thus, a new and improved guide transition device for efficiently coupling light between devices and to output apparatus is disclosed. The new and improved guide transition device is specifically designed to reduce optical crosstalk and other interference. Also, the new and improved guide transition device can be specifically designed to substantially increase alignment tolerance between the planes and better alignment tolerance with external equipment, such as fibers or the like.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A method of fabricating a guide transition device comprising the steps of:

provided a platform including a semiconductor waveguide defining a light input port for receiving a light beam, the semiconductor laser being positioned on a first plane;

forming one end of the semiconductor waveguide into an angled surface;

depositing a polymer planarizing layer on the platform in abutting engagement with the angled surface to provide a first angular deflection surface;

depositing a lower polymer cladding layer on the polymer planarizing layer, depositing a polymer core on the lower polymer cladding layer, and depositing an upper polymer cladding layer on the core and lower polymer cladding layer, the lower polymer cladding layer, the polymer core, and the upper polymer cladding layer forming a polymer waveguide on a second plane different than the first plane with a first end defining a light output port; and removing portions of the lower polymer cladding layer, the core, and the upper polymer cladding layer to form a second angular deflection surface at an end of the polymer waveguide opposite the first end, the first angular deflection surface and the second angular deflection surface having compatible angles so that a light beam directed into the light input port defined by the semiconductor waveguide on the first plane is deflected into the core of the polymer waveguide on the second plane.

2. The method as claimed in claim 1 wherein the step of depositing the lower polymer cladding layer includes the step of depositing by one of spin-on-coating or CVD.

3. The method as claimed in claim 2 wherein the step of depositing the lower polymer cladding layer further includes the step of photolithographic masking and etching the lower polymer cladding layer to define a taper in the core adjacent the first end defining the light output port.

4. The method as claimed in claim 2 wherein the step of depositing the lower polymer cladding layer further includes the step of photolithographic masking and etching the lower polymer cladding layer to define a taper in the core adjacent the second angular deflection surface.

5. The method as claimed in claim 2 wherein the steps of depositing the lower polymer cladding layer on the polymer planarizing layer, depositing the polymer core on the lower polymer cladding layer, and depositing the upper polymer cladding layer on the core and lower polymer cladding layer, further includes the steps of depositing at least one protection layer between the lower polymer cladding layer and the core and depositing at least one protection layer between the upper polymer cladding layer and the core.

* * * * *